United States Patent
Kim et al.

(10) Patent No.: US 9,302,239 B2
(45) Date of Patent: Apr. 5, 2016

(54) GAS-LIQUID CIRCULATING TYPE OF HYDRATE REACTOR

(71) Applicants: Joung Ha Kim, Cheonan-si (KR); Ju Dong Lee, Busan (KR); Jae Ho Yun, Yongin-si (KR); Ho Kyeong Kim, Changwon-si (KR); Sang Min Kim, Busan (KR); Seung Beom Hong, Seoul (KR); Ta Kwan Woo, Busan (KR); Seung Hee An, Ansan-si (KR)

(72) Inventors: Joung Ha Kim, Cheonan-si (KR); Ju Dong Lee, Busan (KR); Jae Ho Yun, Yongin-si (KR); Ho Kyeong Kim, Changwon-si (KR); Sang Min Kim, Busan (KR); Seung Beom Hong, Seoul (KR); Ta Kwan Woo, Busan (KR); Seung Hee An, Ansan-si (KR)

(73) Assignees: Korea Institute Of Industrial Technology, Cheonan-Si (KR); Korea Gas Corporation, Seongnam-Si (KR); Daewoo Engineering & Construction Co., Ltd., Seoul (KR); STX Offshore & Shipbuilding Co., Ltd., Changwon-Si (KR); Sungilturbine Co., Ltd., Busan (KR); Dongshin Hydraulics Co., Ltd., Busan (KR)

( * ) Notice: Subject to any disclaimer, the term of this patent is extended or adjusted under 35 U.S.C. 154(b) by 72 days.

(21) Appl. No.: 14/345,490

(22) PCT Filed: Sep. 18, 2012

(86) PCT No.: PCT/KR2012/007469
§ 371 (c)(1),
(2) Date: Mar. 18, 2014

(87) PCT Pub. No.: WO2013/042924
PCT Pub. Date: Mar. 28, 2013

(65) Prior Publication Data
US 2014/0348720 A1    Nov. 27, 2014

(30) Foreign Application Priority Data
Sep. 19, 2011  (KR) .................. 10-2011-0094311

(51) Int. Cl.

| | |
|---|---|
| *B01J 19/00* | (2006.01) |
| *B01J 19/18* | (2006.01) |
| *B01J 4/00* | (2006.01) |
| *B01J 10/00* | (2006.01) |
| B01J 8/00 | (2006.01) |
| B01J 8/08 | (2006.01) |
| B01J 8/18 | (2006.01) |
| C07C 9/00 | (2006.01) |
| C07C 9/02 | (2006.01) |
| C07C 9/04 | (2006.01) |
| C10L 3/00 | (2006.01) |
| C10L 3/06 | (2006.01) |
| C10L 3/10 | (2006.01) |
| C01B 3/02 | (2006.01) |
| C01B 3/32 | (2006.01) |
| C01B 6/00 | (2006.01) |

(52) U.S. Cl.
CPC *B01J 10/00* (2013.01); *B01J 4/004* (2013.01); *B01J 19/0066* (2013.01); *B01J 19/18* (2013.01)

(58) Field of Classification Search
CPC .............. B01J 4/00; B01J 4/001; B01J 4/004; B01J 8/00; B01J 8/08; B01J 8/18; B01J 10/00; B01J 19/00; B01J 19/0053; B01J 19/0066; B01J 19/18; C07C 9/00–9/04; C10L 3/00; C10L 3/10; C10L 3/108; C10L 3/06; C01B 3/02; C01B 3/32; C01B 6/00
See application file for complete search history.

(56) References Cited

U.S. PATENT DOCUMENTS

| | | | | |
|---|---|---|---|---|
| 4,961,882 | A * | 10/1990 | Bhagat et al. | ......... 261/124 |
| 2009/0235586 | A1 * | 9/2009 | Katoh et al. | ......... 48/127.9 |
| 2011/0015455 | A1 * | 1/2011 | Kanda et al. | ......... 585/15 |

FOREIGN PATENT DOCUMENTS

| JP | 2006124431 A | 5/2006 |
|---|---|---|
| KR | 1020100137285 A | 12/2010 |

OTHER PUBLICATIONS

International Search Report for International Application No. PCT/KR2012/007469, dated Dec. 21, 2012 (2 pages).

Written Opinion of the International Searching Authority for International Application No. PCT/KR2012/007469, dated Dec. 26, 2012 (7 pages).

\* cited by examiner

*Primary Examiner* — Natasha Young (74) *Attorney, Agent, or Firm* — Lathrop & Gage LLP; Michael A. Mattoni; Brian C. Trinque (57) ABSTRACT

According to an embodiment of the present invention, a gas-liquid circulating type gas hydrate reactor, includes: a reactor body configured to be supplied with gas and water to generate a gas hydrate; and a bubble generator configured to be disposed around a lower portion of the reactor body, wherein the gas supplied from the lower portion of the reactor body is jetted into the reactor body through the bubble generator. The gas-liquid circulating type gas hydrate reactor in accordance with the present invention makes it possible to jet gas at a high speed by using the bubble generator disposed at the low portion of the reactor body so as to promote the reaction of water and gas which are accommodated in the reactor body while forming a water stream at the lower portion of the reactor body that enables a smooth agitation of the water and the gas.

4 Claims, 5 Drawing Sheets

GAS-LIQUID CIRCULATING TYPE OF HYDRATE REACTOR

RELATED APPLICATIONS

This application is a 35 U.S.C. §371 filing of International Application No. PCT/KR2012/007469, now WO 2013/042924, filed Sep. 18, 2012, which claims priority to Korean Patent Application No. 10-2011-0094311, filed on Sep. 19, 2011, each of which is incorporated herein by reference in its entirety.

TECHNICAL FIELD

The present invention relates to a gas-liquid circulating type gas hydrate reactor, and more particularly, to a gas-liquid circulating type gas hydrate reactor capable of bubbling gas and jetting the bubbled gas at a high speed by using a bubble generator disposed at a lower portion of a reactor body so as to promote the reaction of water and gas which are accommodated in the reactor body, resulting in a smooth agitation of the water and the gas by forming a water stream at the lower portion of the reactor body.

BACKGROUND ART

A clathrate hydrate means a crystalline compound in which guest molecules are not chemically bonded with each other but are physically captured and trapped in a three-dimensional lattice structure which is formed by a hydrogen bond between host molecules. A gas hydrate has a structure in which the host molecule is a water molecule and the guest molecule is a gas molecule having a low molecular weight such as methane, ethane, propane, and carbon dioxide.

The gas hydrate was first found by Sir Humphry Davy of England in 1810. He announced in the Bakerian Lecture of the Royal Society that when chlorine reacts with water, a compound having a similar form to ice is generated, but the temperature thereof is higher than 0° C. Michael Faraday first found in 1823 that a gas hydrate is generated by a reaction of 10 water molecules with one chlorine molecule.

Up to the present since then, academic study on the gas hydrate, which is one of the phase change materials (PCMs), has continued and the main content of the study has included phase balance and generation/dissociation condition, crystal structure, polycrystalline coexisting phenomenon, competitive composition change within a cavity, and the like and a minute study has been conducted in various microscopic and macroscopic aspects.

It has been known up to now that there are about 130 kinds of guest molecules which may be trapped in the gas hydrate and an example of the guest molecules may include $CH_4$, $C_2H_6$, $C_3H_8$, $CO_2$, $H_2$, $SF_6$, and the like. Further, gas hydrate crystal structures are configured to have a polyhedral cavity which is formed by hydrogen-bonded water molecules and the gas hydrate has a crystal structure of a body-centered cubic structure I (sI), a diamond cubic structure II (sII), and a hexagonal structure H (sH) depending on a kind and a generation condition of gas molecule. The sI and the sII are determined by the size of the guest molecule and in the sH, a size and form of the guest molecule is an important factor.

The guest molecule of the gas hydrate which naturally exists in the deep sea and permafrost areas is mainly methane, and methane has received attention as an environmentally-friendly clean energy source since emission of carbon dioxide ($CO_2$) is small at the time of combustion. In detail, the gas hydrate may be used as an energy source which may replace traditional fossil fuel, as solid storage and transportation of natural gas using the hydrate structure, as isolation/storage of $CO_2$ to prevent global warming, and in, in particular, a seawater desalination apparatus using a gas or aqueous solution separation technology, and therefore the utilizations thereof are very high.

Figure 1A:
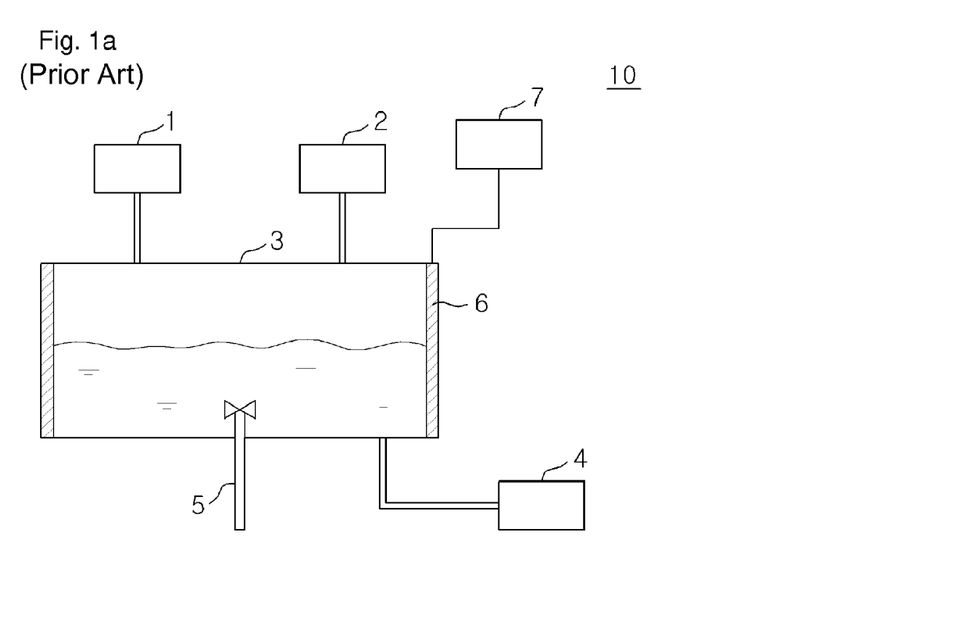
FIG. 1a is a schematic configuration diagram illustrating a typical apparatus for manufacturing a gas hydrate according to the related art.

The gas hydrate is frequently found in an area adjacent to a petroleum or natural gas reservoir and a coal seam or a low-temperature and high-pressure deep sea sediment, in particular, a continental slope area. Further, the gas hydrate may also be artificially manufactured and the existing apparatus for manufacturing a gas hydrate known up to now generally has a structure as illustrated in FIG. 1.

The most important process in the commercialization technology using the apparatus for manufacturing a gas hydrate may be considered to be the formation of hydrate and basically, in order to increase formation speed of the gas hydrate, there is a need to maximize the formation speed of the hydrate by increasing the contact area of gas, in a gaseous state, and water. Further, the process of primarily separating the water that did not react, from the formed gas hydrate slurry is very important.

FIG. 1a illustrates a typical apparatus 10 for manufacturing a gas hydrate according to the related art.

The apparatus 10 for manufacturing a gas hydrate according to the related art is configured to include a water feeder 1, a gas supplier 2, a reactor 3 in which water supplied from the water feeder 1 reacts with gas supplied from the gas supplier 2, a dehydrator 4 which discharges the gas hydrate generated in the reactor 3 to the outside, and an agitator 5 which increases a reaction speed of water and gas. To make the environment within the reactor 3 have temperature conditions appropriate for the manufacturing of gas hydrate, a separate cooling jacket 6 to enclose an outer side of the reactor 3 may be provided. The cooling jacket 6 is connected to a refrigerant supplier 7 and thus may be continuously supplied with a refrigerant.

In the aspect of the above-mentioned manufacturing apparatus 10 of the related art, the water and the gas supplied to the reactor 3 are mixed by the agitator 5 and thus the reactivity is increased, but in this case, a problem exists where the apparatus 10 may perform only simple mixing activities but does not have the mechanism to rapidly propagate a water molecule into a gas molecule.

In addition, the dehydrator 4 is generally disposed at a lower portion or a side of the reactor 3, but a problem exists where it is difficult to directly obtain a high-purity gas hydrate from the reactor 3 by separating water from the gas hydrate slurry, which is generated in such a state.

DISCLOSURE

Technical Problem

The present invention is made by recognizing at least any one of the demands or problems which occur in the related art as described above.

An aspect of the present invention provides a gas-liquid circulating type gas hydrate reactor capable of bubbling gas and jetting the bubbled gas at a high speed by using a bubble generator disposed at a lower portion of a reactor body so as to promote the reaction of water and gas which are accommodated in the reactor body, resulting in a smooth agitation of the water and the gas by forming a water stream at the lower portion of the reactor body.

Another aspect of the present invention obtains a high-purity gas hydrate slurry by including a slurry discharge hole connected to an upper portion of a reactor body in a gas hydrate reactor.

Technical Solution

According to one aspect of the present invention, there is provided a gas-liquid circulating type gas hydrate reactor, including: a reactor body configured to be supplied with gas and water to generate a gas hydrate; and a bubble generator configured to be disposed around a lower portion of the reactor body, wherein the gas supplied from the lower portion of the reactor body is jetted into the reactor body through the bubble generator.

The bubble generator may have a hollow ring shape.

A lower end of the reactor body may have a shape which has a diameter that decreases downwardly.

The gas hydrate reactor may further include: a slurry discharge hole configured to be connected to an upper portion of the gas hydrate reactor.

The gas and the water supplied through the lower portion of the reactor body may react with each other in a gas-suspended-in-liquid phase to thereby fill the reactor body and then may be discharged through the slurry discharge hole as hydrate, non-reaction gas, and non-reaction water.

The gas hydrate reactor may further include: a scraper configured to be rotatably disposed in the reactor body; and a scraper driving motor configured to provide a driving force to the scraper. The scraper may remove a gas hydrate particle which is attached to the reactor body or an inner surface of the upper cover during a rotating driving process.

Advantageous Effects

As described above, according to the gas-liquid circulating type gas hydrate reactor in accordance with the present invention, it is possible to bubble gas and jet the bubbled gas at a high speed by using the bubble generator disposed at the low portion of the reactor body so as to promote the reaction of water and gas which are accommodated in the reactor body and to smooth the agitation of the water and the gas by forming the water stream at the lower portion of the reactor body.

Further, in accordance with the present invention, it is possible to form the state in which the inside of the reactor body is filled with the reaction material by keeping gas and liquid in a gas-suspended-in-liquid phase mixed enough to make it difficult to differentiate the gas from the liquid using the bubble generator which introduces the gas into the water at a high speed and the impeller which promotes the mixing of the water and the gas. Further, the filling state may naturally promote the reaction of water and gas to increase the generation rate of the gas hydrate.

Further, in accordance with the present invention, it is possible to continuously produce the gas hydrate without interruption by continuously supplying water and gas to the lower portion of the reactor body and discharging the gas hydrate, the non-reaction gas, and the non-reaction water to the upper portion of the reactor body. Further, it is possible to effectively utilize the overall reaction material by re-circulating the non-reaction gas and the non-reaction water through the dehydrator to be re-supplied to the reactor body.

MODE FOR INVENTION

Other objects, features, and advantages of the present invention will be more obvious by preferred embodiments of the present invention which are described in more detail with reference to the accompanying drawing. The embodiments to be described are provided for description of the present invention by way of example only, and therefore are not to be construed as restricting the technical scope of the present invention.

Hereinafter, 'gas' means guest gas of a gas hydrate and 'water' means a host molecule. In the generation of the gas hydrate, molecules which may be used as the guest gas may exist in plural such as $CH_4$, $C_2H_6$, $C_3H_8$, $CO_2$, $H_2$, and $SF_6$ and the guest gas is called gas hereinafter. Further, the host molecule is called water ($H_2O$).

Hereinafter, a gas-liquid circulating type gas hydrate reactor according to the embodiment of the present invention will be described in detail with reference to the accompanying drawings.

Description of Configuration of Gas-liquid Circulating Type Gas Hydrate Reactor 100

First, the configuration of the gas-liquid circulating type gas hydrate reactor 100 used in the present invention will be described with reference to FIGS. 1b to 5.

Figure 1B:
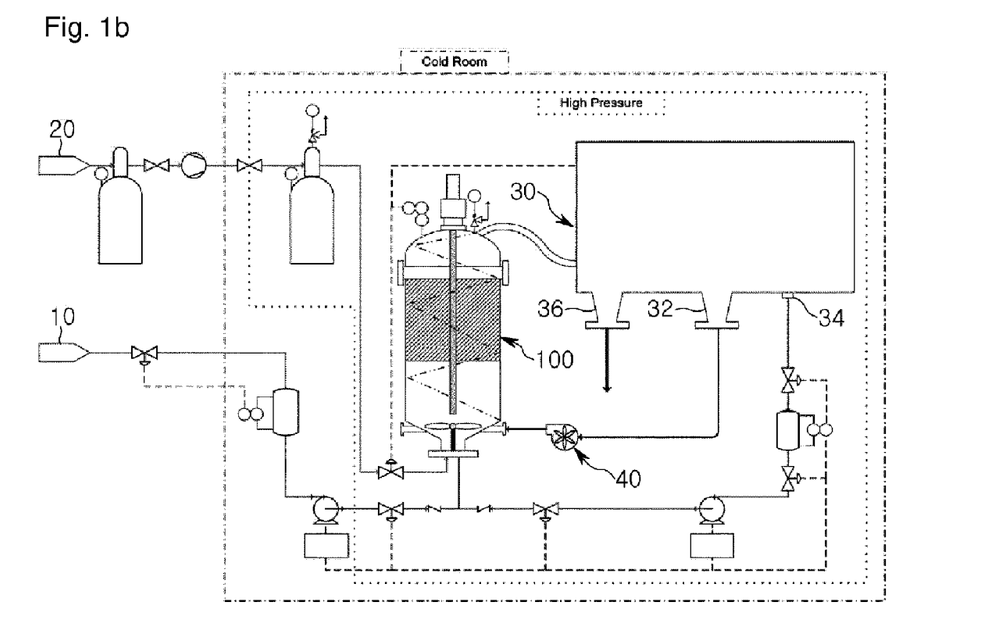
FIG. 1b is an overall configuration diagram illustrating a process of manufacturing hydrate including a gas-liquid circulating type gas hydrate reactor in accordance with an embodiment of the present invention.
Figure 2:
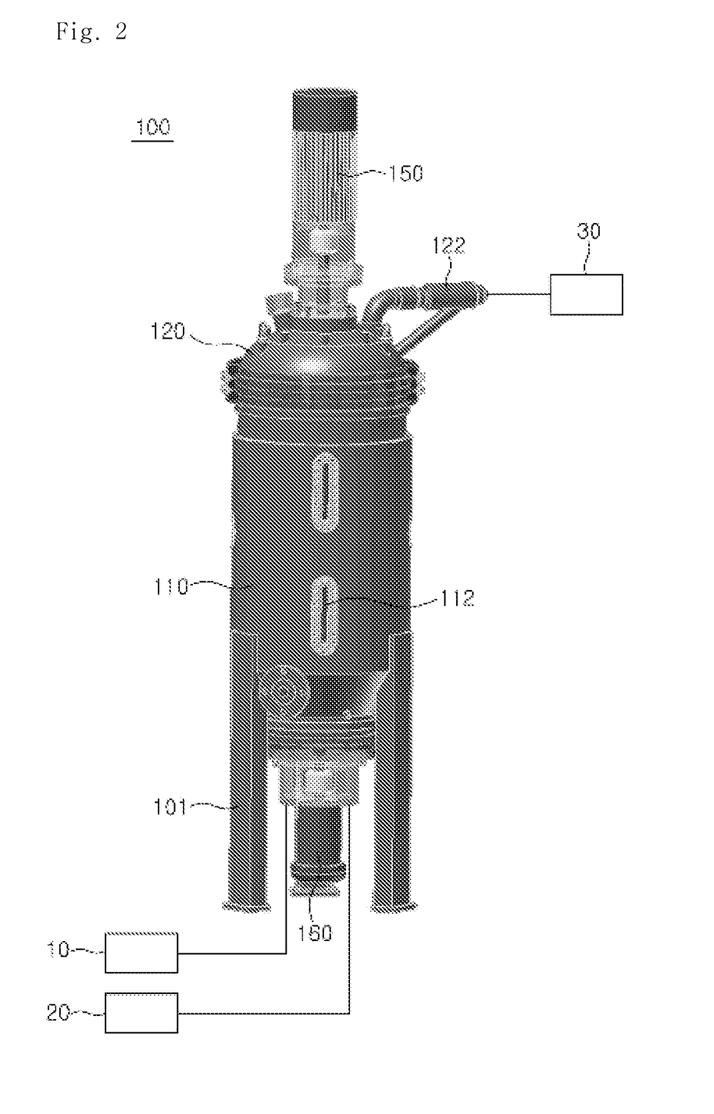
FIG. 2 is a perspective view of the gas-liquid circulating type gas hydrate reactor in accordance with an embodiment of the present invention.
Figure 3:
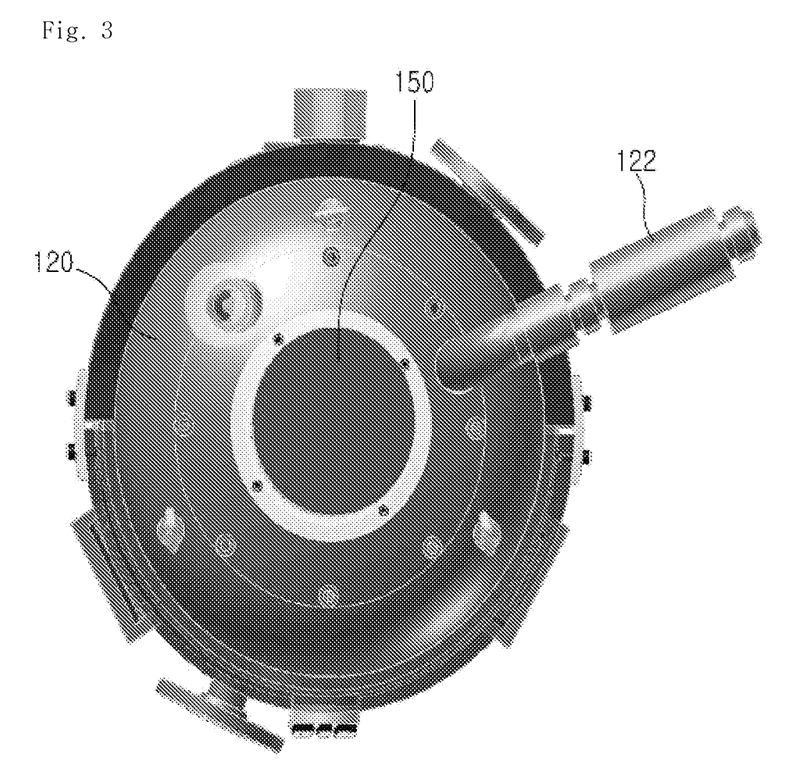
FIG. 3 is a plan view of the gas hydrate reactor in accordance with an embodiment of the present invention which is viewed from the top.
Figure 4:
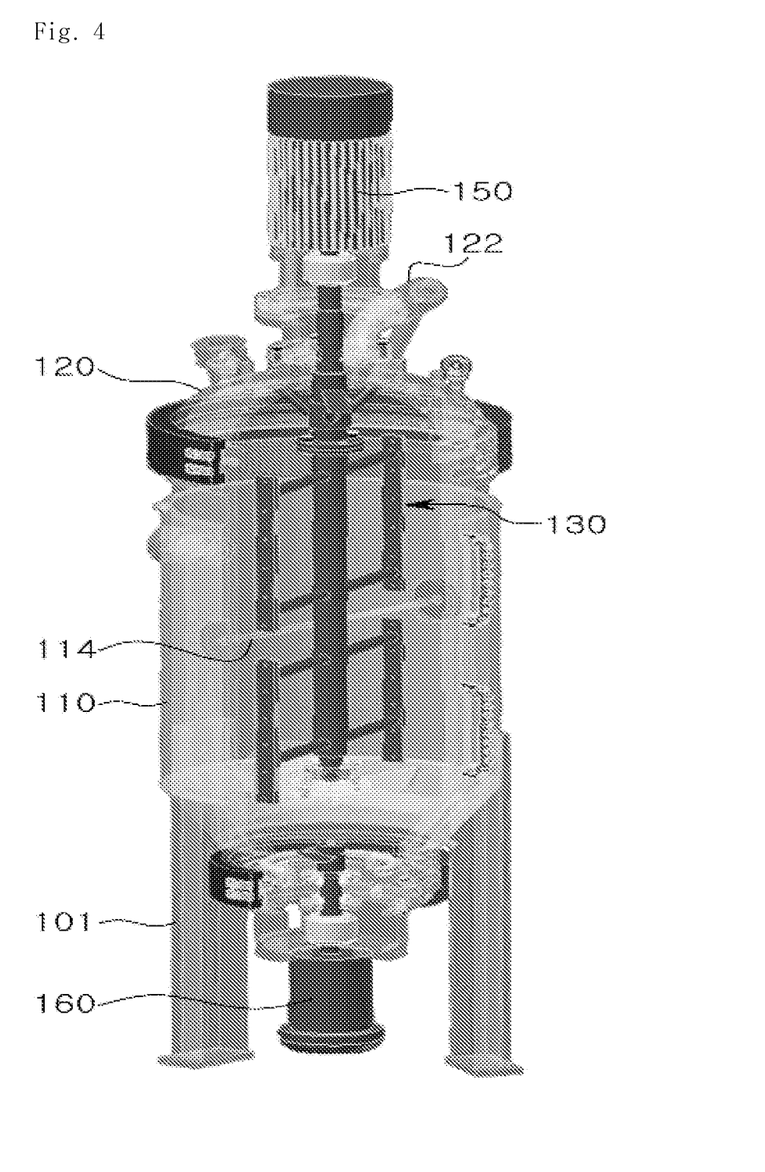
FIG. 4 is a cutaway perspective view illustrating an inside of the gas hydrate reactor in accordance with the embodiment of the present invention.
Figure 5:
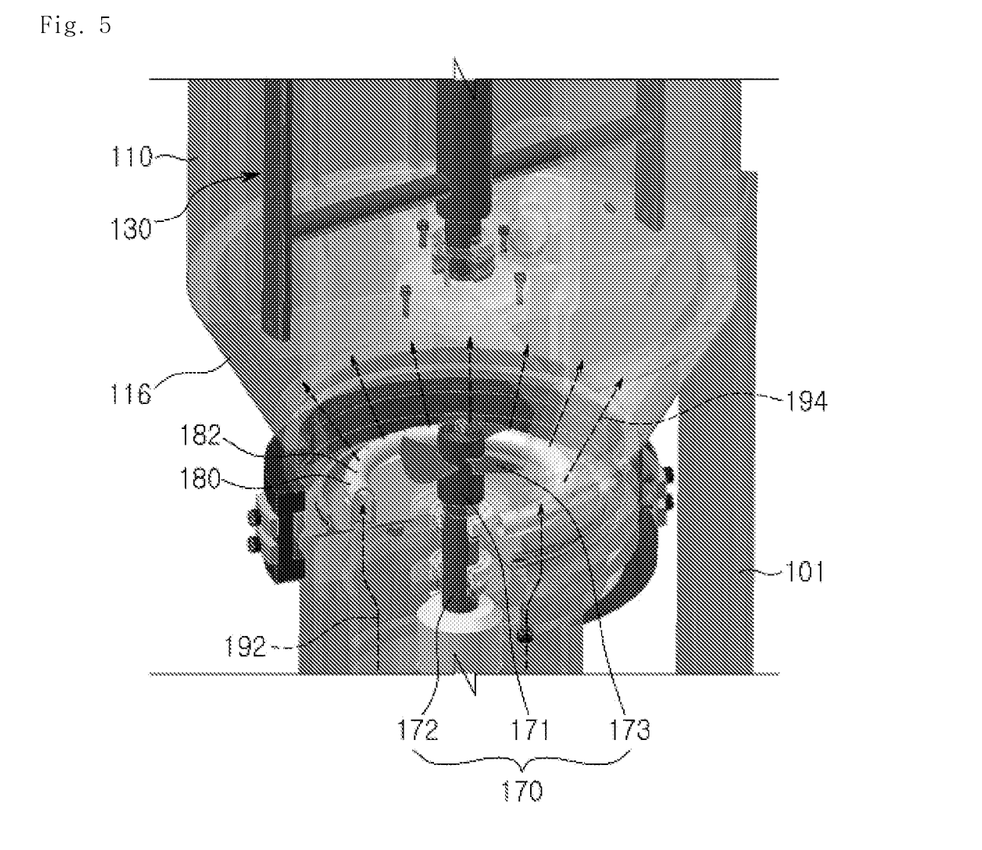
FIG. 5 is a partially enlarged perspective view of FIG. 4 for illustrating in detail a gas-liquid mixing module.

Referring to FIG. 1b, the gas hydrate reactor 100 according to the present invention is connected to a water supply source 10 which supplies water, a gas supply source 20 which supplies gas, and a dehydrator 30 which discharges a gas hydrate generated in the reactor 100. A gas hydrate slurry introduced into the dehydrator 30 has a pellet shape which is standardized by a dehydrating process and may be discharged to a gas hydrate discharge hole 36, in which the separated gas and water suffer from a re-circulating process. That is, the gas from the gas discharge hole 32 of the dehydrator 30 is re-supplied to the reactor 100 through a fan 40 and the water from the water discharge hole 34 of the dehydrator 30 is re-supplied to the reactor 100 via various valves and tanks, and the like.

A temperature sensor, a pressure sensor, a valve, etc., are disposed on the reactor 100, the supply sources 10 and 20, and the dehydrator 30 and the sensor and the valve are connected to a controller and thus may be controlled. The sensor, the controller, and the like may be variously disposed, and therefore the description thereof will be omitted in the present drawings.

Further, a user may input operation parameters and a control unit for controlling the operation of the gas hydrate reactor 100 may be connected to the controller and the description thereof will be omitted in the present drawings.

Further, the present drawings are a schematic concept diagram for describing the gas hydrate reactor 100 according to the embodiment of the present invention and the scope of the present invention may not be limited to a position, a disposition, a connection type, and the like of each component which is illustrated in the present drawings.

The gas hydrate reactor 100 includes a cylindrical reactor body 110, an upper cover 120 which is openly and closely fastened with an upper portion of the reactor body 110, a scraper 130 which is rotatably driven based on a central shaft of the reactor body 110, a scraper driving motor 150 which provides a driving force to the scraper 130, an impeller 170 which is disposed at a lower portion of the reactor body 110, a bubble generator 180 which is disposed to enclose the impeller 170, and an impeller driving motor 160 which provides the driving force to the impeller 170. Herein, supports 101 disposed at a lower end of the reactor body 110 at a predetermined interval stably dispose the gas hydrate reactor 100 on a ground.

The gas hydrate reactor 100 generates the gas hydrate slurry by supplying water and gas from the external supply sources 10 and 20 into the reactor body 110 through the lower portion of the reactor body 110 and then by reacting the water and the gas depending on the rotating driving of the impeller 170 and the scraper 130. During the process, the gas discharged through the bubble generator 180 is jetted into the water at a high speed to form a bubble, thereby increasing a contact area between the water and the gas.

As described above, according to the present invention, the gas and the water may be maintained in a gas-suspended-in-liquid phase mixed enough to make it difficult to differentiate the gas from the liquid by the process of introducing the gas jetted through the bubble generator 180 into the water at high speed, in which the gas-suspended-in-liquid phase may be made when the fine gas bubble is jetted through the bubble generator 180 with a high pressure, differently from the related art.

The present invention has a structure in which in the state in which the inside of the reactor body 110 is filled with the water and the gas, the gas is continuously bubbled and supplied and at the same time the water is supplied, and therefore the discharged amount of the gas hydrate is in proportion to the introduced flow rate.

Herein, when the scraper 130 and the impeller 170 simultaneously rotate within the reactor body 110, the scraper 130 removes particles of the gas hydrate which may be attached to an inner surface of the reactor 100 and the impeller 170 smoothes the agitation of water and gas which are accommodated in the reactor body 110 to create the environment in which the generation reaction of the gas hydrate may be promoted.

The gas hydrate slurry generated in the reactor body 110 is discharged from the gas hydrate reactor 100 through a sludge discharge hole 122 connected to the upper cover 120 and the discharged gas hydrate slurry suffers from processes such as dehydrating, cleaning, compressing, etc., to be palletized or additionally suffers from process such as dissociation to be desalinated.

The reactor body 110 may be used as the reactor in which water reacts with gas and may be used as a dehydrator and a storage tank. That is, the process of generating the gas hydrate is performed and then the dehydrating and storing processes are separately be performed, but these processes are performed simultaneously, and therefore various processes may be performed in a single space.

The upper cover 120 may be configured in an opening and closing scheme of a lid type and one portion of the upper cover 120 is coupled with an upper end of the reactor body 110 by a clamp scheme, such that the upper portion of the reactor body 110 may be easily opened and closed.

The scraper 130 serves to separate and remove the particles of the gas hydrate which may be attached to an inner surface of the reactor body 110 while the scraper 130 is rotatably driven based on the central shaft of the reactor body 110.

The impeller 170 includes a rotating shaft 172 which is directly connected to the impeller driving motor 160, a rib 171 which is coupled with an end of the rotating shaft 172, and blades 173 which are disposed on an outer peripheral surface of the rib 171 at a predetermined interval. The blade 173 may be extendedly formed in a spiral shape from the outer peripheral surface of the rib 171. In the state in which the impeller 170 is disposed at the lower portion of the reactor body 110, the impeller 170 may supply the water and the gas introduced into the reactor body 110 in the state in which the water is appropriately mixed with the gas. That is, in order for the reaction materials supplied through the lower portion of the reactor body 110 to be diffused up at a rapid speed, the rotating force is provided to the impeller 170 through the separate impeller driving motor 160.

The bubble generator 180 is formed in a hollow ring shape at a lower end of the reactor body 110. Jet holes 182 are disposed on the upper surface of the bubble generator 180 at a predetermined interval. Meanwhile, the jet hole 182 may jet bubbles, with being inclined to the upper surface of the bubble generator 180 at a predetermined angle and the bubbles obliquely jetted in the inclined state by the disposition structure form a water stream having a vortex shape.

The present invention increases the reaction speed of water and gas to increase a dissolution rate, thereby increasing the generation rate of the gas hydrate. To this end, it is preferable to widen a reacting surface area. To widen the reaction surface area of materials such as water and gas, the bubble generator 180 is to form bubbles into water. In particular, when a total volume of the generated bubbles is the same, forming a large number of bubbles having a small size may more expand a surface area of a fluid than forming a small number of bubbles having a large size. The bubbles having a small size which is preferable to increase the surface area of the reaction materials is called a micro bubble, which generally means a bubble having a particle size of about 50 micron or so, preferably about 10 micron.

The bubble generator 180 may have a form to enclose the impeller 170 and may be disposed further down on the reactor body 110, as compared with the blade 173 of the impeller 170. This may be configured to allow the blade 173 to raise the gas bubble jetted from the jet hole 182 of the bubble generator 180 effectively.

Both of the bubble generator 180 and the impeller 170 are disposed at the lower portion of the reactor body 110 and accelerate the mixing of supplied water and gas, which has a larger effect in connection with the structure of the lower portion of the reactor body 110.

Describing in detail, a lower end 116 of the reactor body 110 may have a cyclone shape which has a diameter that decreases downwardly, which creates the optimal environment in which the bubble particle radially jetted from the bubble generator 180 may be freely diffused by the rotating driving of the impeller 170. That is, the bubble particle discharged through the bubble generator 180 rotates by the water stream generated by the impeller 170 and is rapidly diffused into water and the lower end 116 of the reactor body 110 has a shape having a diameter gradually increasing from the bottom to make the activated bubble particle be rapidly diffused upwardly.

Description of Operation of Gas-liquid Circulating Type Gas Hydrate Reactor 100

Hereinafter, the operation process of the gas-liquid circulating type gas hydrate reactor 100 will be described with reference to FIGS. 1 to 5.

First, the water and the gas are supplied to the lower portion of the reactor body 110 through the supply sources 10 and 20. The introduced gas is introduced into the lower end of the bubble generator 180 (see reference numeral 192) and is discharged through the jet hole 192 (see reference numeral 194). The gas jetted from the bubble generator 180 is bubbled in water and moves upwardly from the reactor body 110 by the water stream formed by rotating the impeller 170 operated by impeller driving motor 160 and is dispersed and diffused. During the process, the lower end 116 of the reactor body 110 having the cyclone shape smoothes the dispersion of the jetted water and gas.

Herein, the gas jetted through the bubble generator 180 is introduced into water at a high speed and is thus maintained in the gas-suspended-in-liquid phase mixed enough to make it difficult to differentiate the gas from the liquid.

Among the gas hydrate slurries generated depending on the reaction of water and gas within the reactor body 110, the particle attached into the inner surface of the reactor body 110 is removed by rotating the scraper 130 which is operated by the scraper driving motor 150. Meanwhile, the controller measure a temperature in real time using a thermometer 114 which is disposed in the reactor body 110 and checks whether the temperature for generating the gas hydrate is in an appropriate temperature based on the measured temperature.

A see-through window 112 which is formed in the reactor body 110 has an oval structure and thus it may be confirmed with the naked eyes whether the reaction is properly performed during the generation reaction of the gas hydrate.

The gas hydrate slurry, the non-reacting gas, and the non-reacting water which are generated in the reactor body 110 are discharged from the reactor 100 through the slurry discharge hole 122 coupled with the upper cover 120 and are introduced into the dehydrator 30. The gas hydrate slurry is palletized or desalinated by suffering from the processes such as dehydrating, compressing, and cleaning in the dehydrator 30. The non-reacting gas is re-supplied to the reactor 100 through the fan 40 and the non-reacting water is re-supplied to the reactor 100 through various valves and tanks, and the like.

The slurry discharge hole 122 is disposed at the upper end of the reactor 100, such that the water and the gas introduced into the lower portion of the reactor body 110 may react with each other at a rapid speed and then may be discharged from the reactor body 110. Since the reaction is performed in the state in which the inside of the reactor body 110 is filled with the water and the gas introduced into the lower portion of the reactor body 110, the structure in which the fluid as much as the introduced flow rate may be discharged may be implemented.

As described above, the gas-liquid circulating type gas hydrate reactor according to the embodiment of the present invention jets the gas supplied to the lower portion of the reactor body through the bubble generator at a high speed to form the bubble in water and forms the water stream at the lower portion of the reactor body through the impeller to be raised in the state in which the water and the gas are mixed with each other. As described above, the bubble generated by the bubble generator and the water stream formed by the impeller smooth the agitation of the water and the gas introduced into the reactor body to promote the reaction, thereby increasing the generation efficiency of the gas hydrate.

Hereinabove, the preferred embodiments of the present invention are described but the present invention is not limited to the above-mentioned specific embodiments. That is, it may be appreciated by those skilled in the art that modifications and alterations may be made without departing from the spirit and the scope of the appended claims, and that all equivalents of such modifications and alterations fall within the scope of the present invention.

The invention claimed is:

1. A gas hydrate reactor, comprising:
   a reactor body configured to be supplied with gas and water to generate a gas hydrate;
   an impeller configured to be disposed in the reactor body; and
   a bubble generator configured to be disposed in the reactor body,
   wherein the gas supplied from the lower portion of the reactor body is jetted into the reactor body through the bubble generator,
   wherein a lower end of the reactor body has a shape which has a diameter that decreases downwardly, and the impeller and the bubble generator are disposed in the lower end of the reactor body,
   wherein the bubble generator has a ring shape to surround the impeller, and
   wherein the bubble generator has a plurality of jet holes disposed to be inclined to the upper surface of the bubble generator, such that bubbles of the gas are obliquely jetted through the plurality of jet holes into the reactor body.

2. The gas hydrate reactor of claim 1, further comprising:
   a slurry discharge hole configured to be connected to an upper portion of the gas hydrate reactor.

3. The gas hydrate reactor of claim 2, wherein the gas and the water supplied through the lower portion of the reactor body react with each other in a gas-suspended-in-liquid phase to thereby fill the reactor body and then are discharged through the slurry discharge hole as hydrate, non-reaction gas, and non-reaction water.

4. The gas hydrate reactor of claim 1, wherein the gas hydrate reactor further includes:
   a scraper configured to be rotatably disposed in the reactor body; and
   a scraper driving motor configured to provide a driving force to the scraper, and
   wherein the scraper removes a gas hydrate particle which is attached to the reactor body or an inner surface of the upper cover during a rotating driving process.

* * * * *